US007928024B2

(12) United States Patent
Kochesky et al.

(10) Patent No.: US 7,928,024 B2
(45) Date of Patent: *Apr. 19, 2011

(54) COMPOSITE PAD WITH ENHANCED RESISTANCE TO INTERLAMINAR DELAMINATION AND A METHOD FOR THE MANUFACTURE THEREOF

(75) Inventors: Francis F. Kochesky, Newburgh, NY (US); Kalyn S. Kimler, Walden, NY (US); Mark A. Pryne, Cornwall, NY (US)

(73) Assignee: American Felt and Filter Company, New Windsor, NY (US)

( * ) Notice: Subject to any disclaimer, the term of this patent is extended or adjusted under 35 U.S.C. 154(b) by 1129 days.

This patent is subject to a terminal disclaimer.

(21) Appl. No.: 11/385,637

(22) Filed: Mar. 21, 2006

(65) Prior Publication Data

US 2006/0156936 A1 Jul. 20, 2006

Related U.S. Application Data

(63) Continuation-in-part of application No. 11/234,773, filed on Sep. 23, 2005, now Pat. No. 7,156,020.

(60) Provisional application No. 60/612,425, filed on Sep. 23, 2004.

(51) Int. Cl.
*B32B 5/26* (2006.01)

(52) U.S. Cl. ...................... 442/381; 442/361; 428/296.7

(58) Field of Classification Search .......... 442/361–364, 442/381
See application file for complete search history.

(56) References Cited

U.S. PATENT DOCUMENTS

| | | | | |
|---|---|---|---|---|
| 4,652,484 | A * | 3/1987 | Shiba et al. | 442/353 |
| 5,114,787 | A * | 5/1992 | Chaplin et al. | 442/361 |
| 5,128,193 | A * | 7/1992 | Anapol et al. | 428/171 |
| 5,415,925 | A * | 5/1995 | Austin et al. | 442/346 |
| 7,156,020 | B2 * | 1/2007 | Kochesky | 101/333 |

* cited by examiner

*Primary Examiner* — Lynda Salvatore
(74) *Attorney, Agent, or Firm* — Amad Tayebi

(57) ABSTRACT

A composite pad is made of two layers joined together at their interface. The top layer of the composite pad, which has a smooth surface has a dense and firm fine denier fibrous structure. The bottom layer of the composite pad has a lighter and softer coarser denier fibrous structure in order to be able to have a large fluid holding capacity. A method of manufacturing the composite stamp pad is described.

2 Claims, 1 Drawing Sheet

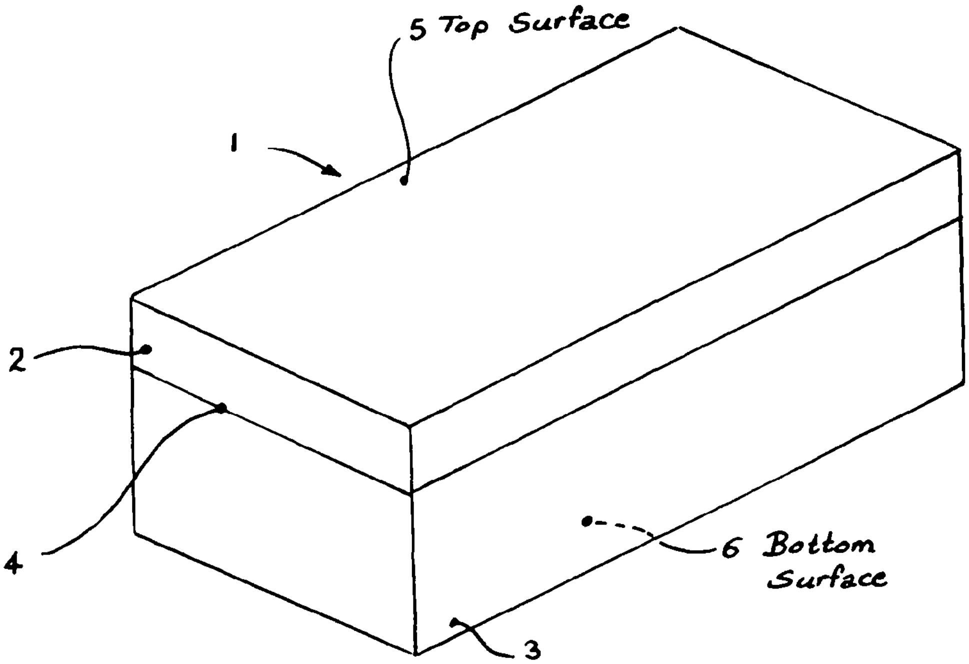
Figure (1)
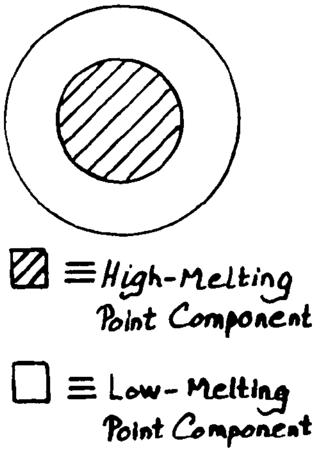
Figure (2)
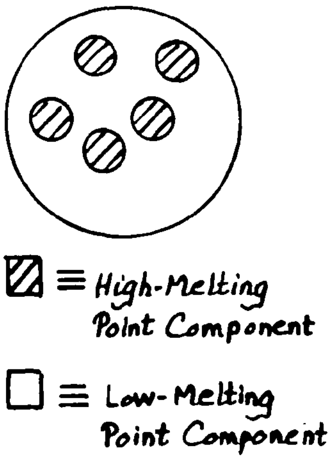
Figure (3)
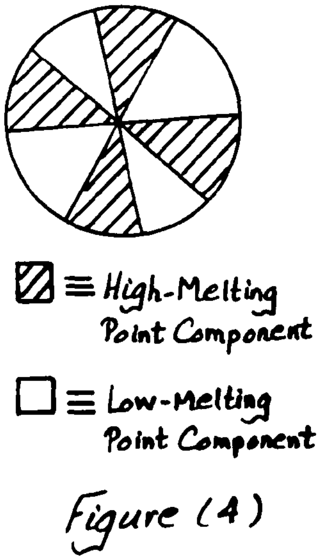
Figure (4)

COMPOSITE PAD WITH ENHANCED RESISTANCE TO INTERLAMINAR DELAMINATION AND A METHOD FOR THE MANUFACTURE THEREOF

This continuation in part application claims priority of Non-provisional Utility application Ser. No. 11/234,773 filed on Sep. 23, 2005 now U.S. Pat. No. 7,156,020. Application Ser. No. 11/234,773 claims priority of Provisional Patent Application No. 60/612,425 filed on Sep. 23, 2004.

FIELD OF THE INVENTION

The present invention is in the field of composite pads. In particular, it relates to a porous or permeable structure pad made from a fibrous material and having a composite structure.

In a specific application of the present invention, the composite pad is used as a stamp pad. The top layer of the composite stamp pad, which contacts the raised points side of the stamp, has a dense and firm fine (low) denier fibrous structure in order to be able to transfer ink to the raised points of the stamp with higher precision and without depositing ink into the recessed areas located between the raised points of the stamp. The bottom layer of the composite stamp pad has a lighter (lower density) and softer coarser (higher) denier fibrous structure in order to be able to have a large ink holding capacity, i.e., to act as a high-capacity ink reservoir.

The present invention also teaches a method of manufacturing the composite pad and enhancing its resistance to interlaminar delamination.

SUMMARY OF THE INVENTION

In accordance with the present invention a novel porous pad is provided. The pad is of a composite structure and comprises an upper portion and an bottom portion. The upper portion comprises a first plurality of fibers. The first plurality of fibers comprises low denier bicomponent fibers, said bicomponent fibers being cohesively bonded together and/or to other fibers which may be contained in said first plurality of fibers at inter-fiber crossover points. A cohesive bond, in accordance with the present invention, is defined as a bond generated by a melting or at least a partial melting action at the contact point between at least two fibers and cosolidification of the contact point as the temperature of the fibers at the contact point is reduced to a temperature below the melting point of their surface contact point. The bottom portion comprises a second plurality of fibers, preferably comprising bicomponent fibers, said second plurality of fibers being, on the average, coarser (higher denier) than said bicomponent fibers of said first plurality of fibers by at least 2 denier. The fibers of the second plurality of fibers being bonded together, preferably cohesively at interfiber crossover points. The upper portion and the bottom portion being joined together at their interface as a two-layer composite structure, thereby providing a composite pad with a bottom portion acting as a high-fluid-holding capacity reservoir and an upper portion having a smooth exterior surface.

In order to enhance the bond between the upper and bottom portions of the composite pad, a porous low-melting point adhesive web is positioned/placed between the upper portion and the bottom portion of the composite pad. The three-layer assembly is then heated in order to melt the adhesive web which bonds/joins together the upper and bottom portions of the composite pad and enhances the pad's resistance to delamination.

In a specific application of the present invention, the composite pad is used as a stamp pad. This is achieved by fabricating the composite pad, for example by cutting it into desired shape and dimensions to fit into a stamp pad holder, and placing it into the stamp pad holder. The composite stamp pad, so obtained, has a high capacity ink reservoir bottom portion and a top portion with a smooth surface and high precision of ink transfer to the raised points of a stamp.

BACKGROUND OF THE INVENTION

Examination of the prior art yields a variety of designs, compositions and structures of porous composite pads and stamp pads. Some are made of felt material and covered with woven fabrics. Others are made of open-cell foams or are made of gel-like materials. In particular, stamp pads of the prior art which utilize fibrous materials suffer from lack of uniform and accurate transfer of ink from the pad to the raised points side of the stamp. This lack of uniformity and accuracy may be attributable to the use of coarse fibers in the stamp pad or due to the coarse structure of the woven fabric covering the stamp pad surface. Coarse fibers, in a low density structure, provide a higher capacity of ink retention between them, i.e., a higher-capacity ink reservoir. Finer fibers, on the other hand, yield better accuracy and uniformity of ink transfer to the raised points of the stamp but suffer from having a reduced ink storage capacity.

The present invention overcomes this problem and provides a porous composite pad especially suitable for use as a stamp pad that has high ink retention/storage capacity as well as excellent uniformity and accuracy of ink transfer from the stamping face of the stamp pad to the raised points/surfaces of the stamp.

BRIEF DESCRIPTION OF THE DRAWING

FIG. 1 shows an isometric view of composite pad.

FIG. 2 shows a sheath-core type of bicomponent fibers.

FIG. 3 shows an islands type of bicomponent fibers.

FIG. 4 shows a segmented distribution type of bicomponent fiber.

DETAILED DESCRIPTION OF THE INVENTION

As shown in FIG. 1, the porous composite pad 1 of the present invention comprises an upper portion 2, having a top surface 5, and a bottom portion 3, having a bottom surface 6. Bottom portion 3 and upper portion 2 are joined together, cohesively, at their interface 4. Upper portion 2 is made of a porous fibrous structure which is made of a first plurality of fibers, said first plurality of fibers comprising low denier bicomponent fibers having a weight percentage of at least 75% of the total weight of the upper portion. The remaining percentage of weight includes other fibers, including regular or standard (single component) fibers or other fiber coatings, colorings and/or surface treatment agents, such as surfactants. In accordance with the present invention, it is preferable that all the fibers contained in the upper portion 2 be bicomponent fibers, i.e., the weight percent of the bicomponent fibers is preferably 100%.

The bicomponent fibers of the upper portion are preferably of the sheath-core type and having a sheath component melting point lower than that of the core component. For example, such fibers may be 2 denier sheath-core polyester bicomponent staple fibers having a sheath melting point of 230° F. The melting point of the core portion, of the bicomponent fibers of the upper portion, is higher than that of the sheath portion by at least 50° F. The bicomponent fibers used in the upper portion and/or in the bottom portion of the porous composite pad may be sheath-core type, island-type or having a radially segmented distribution of the low and high melting point segments, as shown in FIGS. 2, 3 and 4, respectively. Also, a variety of polymeric materials may be used in the low melting point and in the high melting point portions of the bicomponent fibers, including polyethylene, polyester and polypropylene. The polymeric material of the sheath layer may be different from the polymeric material of the core component. In accordance with the present invention, the denier of the fibers of the upper portion ranges from 0.5 to 4. Also, in accordance with the present invention, a preferred denier is 2.

In accordance with the present invention, a method is disclosed herein for manufacturing the above described composite pad 1. The method comprises the steps of:

1) providing a first plurality of fibers for preparing the upper portion 2 of the composite stamp pad and intimately, i.e., thoroughly and uniformly, blending them, said first plurality of fibers comprising bicomponent fibers constituting at least 75% of the total weight of said first plurality of fibers. The remaining portion of weight of said first plurality of fibers may include other fibers, including regular fibers or standard (single component) fibers or other fiber coatings, colorings and/or surface treatment agents such as surfactants. Preferably, however, said first plurality of fibers is 100% bicomponent fibers of the sheath-core type and having a sheath component melting point lower than that of the core component. Preferably, the melting point of the sheath component is around 230° F. Also, the melting point of the core component is at least 50° F. higher than the melting point of the sheath portion. Said first plurality of fibers having deniers in the range of 0.5 to 4.0, preferably 2.

2) carding said first plurality of fibers into a uniform first carded web having a basis weight in the range of 9 to 14 ounces per square yard (oz/sq. yd) and preferably 11 to 12 oz/sq. yd.

3) tacking, i.e., lightly needle punching said first carded web in order to enhance its integrity and to be able to handle it without excessive stretching.

4) subjecting the tacked first carded web to a first heating step, preferably in a stress-free condition by placing the tacked first carded web in an oven at a temperature in the range of 280° F. to 350° F. This first heating step may be accomplished by placing the web, in a stress-free state, into an oven, at a temperature at least 50° F. higher than the melting point of the low melting point component but lower than the melting point of the high melting point component of the bicomponent fibers for a duration of 10 to 15 minutes. This first heating step allows the constituent fibers to shrink in a stress-free state. A typical shrinkage experienced by the tacked first carded web is about 20% by area. For example, a web of initial basis weight of 11 to 12 oz./sq. yd shrinks to 13.75 to 15 oz./sq. yd.

5) hot pressing said first carded and shrunk web in a heated press at a temperature at least equal to the melting point of the low melting point component but not exceeding the melting point of the high melting point component of the bicomponent fibers. A preferable temperature used for pressing the stamping face portion is 300° F., when the melting point of the low melting point component is 230° F., for a duration of 1 to 4 minutes, preferably 3 minutes. Using stop bars, i.e., spacer bars placed between the heated press platens, the first carded web is pressed to the desired thickness, into a compacted porous structure, for example, to a thickness in the range of 0.020 to 0.050 inch and preferably to a thickness of 0.020 inch. For the above mentioned example, using stop bars of 0.055 inch and a first carded web of 9 oz/square yard yields a pressed thickness in the range of 0.040 to 0.045 inch. In another embodiment of the present invention, using a first carded web of initial basis weight in the range of 11 to 12 ounces per square yard, pre-shrinking it, as described above, and pressing it, using spacer bars, to a thickness of 0.020 inch yields a bulk density of 57.3 to 62.5 lb/cubic foot which is an acceptable and preferred density for use as a stamping face portion of a composite stamp pad.

6) providing a second plurality of fibers for preparing the bottom portion 3 of the composite pad and intimately, i.e., thoroughly and uniformly, blending them, said second plurality of fibers preferably comprising bicomponent fibers constituting at least 25% of the total weight of said second plurality of fibers. The remaining portion of weight of said second plurality of fibers may include other fibers, including regular fibers or standard (single component) fibers or other fiber coatings, colorings and/or surface treatment agents such as surfactants. The bicomponent fibers of the bottom portion may be dissimilar but preferably are similar to those of the upper portion with regard to their geometric cross sectional material distribution, type of polymeric materials used, melting points and difference between the high and low melting points of their components, preferred melting points, etc. The fibers of the bottom portion, however, are coarser than those of the upper portion by at least 2 denier. In accordance with the present invention, the fibers of the upper portion are preferably 2 denier fibers and the fibers of the bottom portion are preferably 6 denier fibers. The denier of the fibers of the bottom portion is at least 2.5.

7) carding said second plurality of fibers into a uniform second carded web having a basis weight in the range of 18 to 28 ounces per square yard (oz/sq. yd) and preferably 20 to 22 oz/sq. yd.

8) tacking, i.e., lightly needle punching said second carded web in order to enhance its integrity and to be able to handle it without excessive stretching.

9) subjecting the tacked second carded web to a first heating step, preferably in a stress-free condition by placing the tacked second carded web in an oven at a temperature in the range of 280° F. ° F. to 350° F. This first heating step may be accomplished by placing the web, in a stress-free state, into an oven at a temperature at least 50° F. higher than the melting point of the low melting point component but lower than the melting point of the high melting point component of the bicomponent fibers for a duration of 10 to 15 minutes. This first heating step allows the constituent fibers to shrink in a stress-free state. A typical shrinkage experienced by the tacked second carded web is about 20% by area. For example, a web of initial basis weight of 20 to 22 oz./sq. yd. shrinks to 25 to 27.5 oz./sq. yd.

10) cohesively joining the upper portion and the bottom portion into a composite pad sheet by hot pressing them together. This hot pressing process is accomplished by placing the pressed upper portion, in a sheet form, on top of the pre-shrunk bottom portion, also in a sheet form, and placing the assembly in a hot press and compressing them together, using spacer bars placed between the heated press platens, to a total thickness in the range of 3/16 to 3/8 inch, preferably 1/4 inch. This hot pressing step is carried out at a temperature of 280° F. to 320° F., preferably at 300° F. for a period of 1 to 4 minutes, preferably 3 minutes. For example, using a first carded web of a pre-shrinking basis weight of 9 oz/sq. yd. and a second carded web of a pre-shrinking basis weight of 21 oz/sq. yd., following the above described steps and cohesively joining the upper portion and the bottom portion into a composite pad sheet by hot pressing them together, using stop bars of 0.265 inch thickness for a heating duration of 3 minutes at a temperature of 300° F. yields a finished composite stamp pad of a thickness in the range of 0.240 to 0.250 inch. Such a porous composite pad is especially suitable for use as a composite stamp pad, which is obtained by the additional step of fabricating a composite stamp pad by cutting the composite pad sheet, thus obtained, into the desired shape and dimensions to fit a stamp pad tray, receiver, container, holder or a box.

In order to enhance the delamination resistance of the composite pad of the present invention, a porous low melting point adhesive web, made of a low melting-point thermoplastic polymeric material, is placed/positioned between the hot pressed first carded web (the top portion of the composite pad), as described in step 5 above, and the heat-treated second carded web, (the bottom portion of the composite pad) as described in step 9 above. The adhesive web joins the top portion and the bottom portion of the composite pad as the three-layer assembly is cohesively bonded together in a heated press, using spacer bars, thus forming a three-layer porous composite pad. For example, using a first carded web made of 100% 2 denier bicomponent polyester fibers of a pre-shrinking basis weight of 9 oz/sq. yd. and a second carded web made of 100% 6 denier bicomponent fibers of a pre-shrinking basis weight of 21 oz/sq. yd., following the above described steps and placing a low melting point copolyester adhesive web, (having a basis weight in the range of 0.7 to 2 oz/sq. yd.), between said first carded web and said second carded web, and cohesively joining the three layer assembly into a delamination resistant composite pad sheet by hot pressing them together, using stop bars of 0.265 inch thickness for a heating duration of 3 minutes at a temperature of 300° F. yields a finished three-layer delamination resistant composite pad of a thickness in the range of 0.240 to 0.250 inch and having a high fluid-holding capacity bottom portion reservoir and an upper portion having a smooth surface. A typical, commercially available, porous adhesive web is available from Spunfab Ltd.

The use of an adhesive web, for joining the upper portion and the bottom portion of the porous composite pad, makes it possible to use dissimilar fibers in making the first carded web and the second carded web.

The invention claimed is:

1. A three-layer porous composite pad with enhanced resistance to delamination comprising;

an upper portion, a porous adhesive web and a bottom portion, said upper portion comprising a first plurality of fibers, said first plurality of fibers comprising low denier bicomponent fibers, said low denier bicomponent fibers being cohesively bonded at inter-fiber crossover points, said upper portion being prepared by providing said first plurality of fibers, carding said first plurality of fibers into a uniform first carded web, subjecting said first carded web to a first heating step, said first heating step being accomplished by placing said first carded web, in a stress-free state, into an oven, at a temperature in the range of 280° F. to 350° F. for a duration of 10 to 15 minutes, thereby allowing the constituent fibers of said upper portion to shrink in a stress-free state, and hot pressing, using spacer bars placed between heated press platens to a desired thickness in the range of 0.020" to 0.050", said first carded and shrunk web in a heated press at a temperature at least equal to the melting point of the low melting point component but not exceeding the melting point of the high melting point component of said low denier bicomponent fibers, said bottom portion comprising a second plurality of fibers, said second plurality of fibers comprising coarser bicomponent fibers, said coarser bicomponent fibers being, on the average, coarser than said low denier bicomponent fibers of said first plurality of fibers by at least 2 denier, said coarser bicomponent fibers being cohesively bonded at interfiber crossover points, said bottom portion being prepared by providing said second plurality of fibers, carding said second plurality of fibers into a uniform second carded web, subjecting said second carded web to a first heating step, said first heating step being accomplished by placing said second carded web, in a stress-free state, into an oven, at a temperature in the range of 280° F. to 350° F. for a duration of 10 to 15 minutes, thereby allowing the constituent fibers of said bottom portion to shrink in a stress-free state, and hot pressing, using spacer bars placed between heated press platens to a desired thickness, said second carded and shrunk web in a heated press at a temperature at least equal to the melting point of the low melting point component but not exceeding the melting point of the high melting point component of said coarser bicomponent fibers, and said porous adhesive web being made of a low melting point thermoplastic polymeric material, said adhesive web being positioned between said top portion and said bottom portion and joining said top portion to said bottom portion, thus forming a three-layer porous composite pad and thereby providing a delamination resistant composite pad having a high fluid-holding capacity bottom portion reservoir and an upper portion having a smooth surface.

2. A three-layer porous composite pad in accordance with claim 1, wherein the basis weight of said low melting point adhesive web being in the range from 0.7 to 2 ounces per square yard.

* * * * *